July 19, 1938.  W. A. BERTRAND  2,124,363
MASTER CYLINDER FOR HYDRAULIC BRAKING SYSTEMS
Filed Feb. 11, 1937
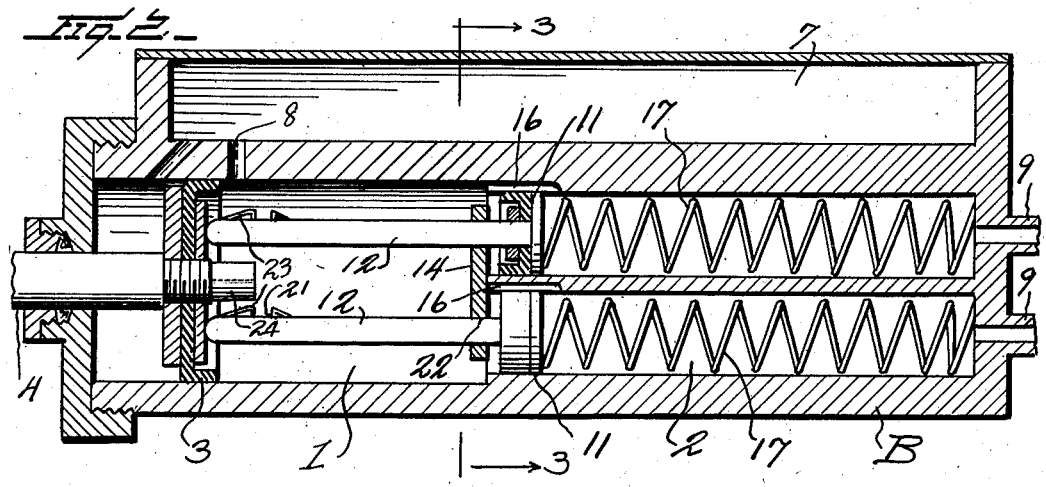
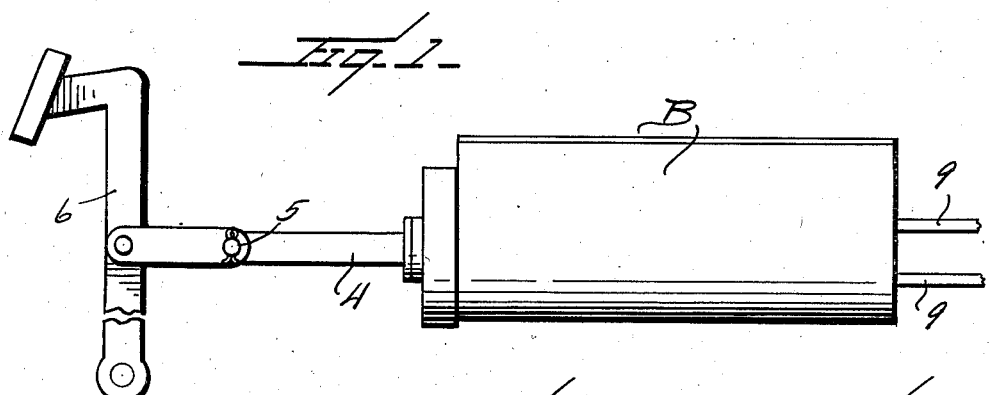
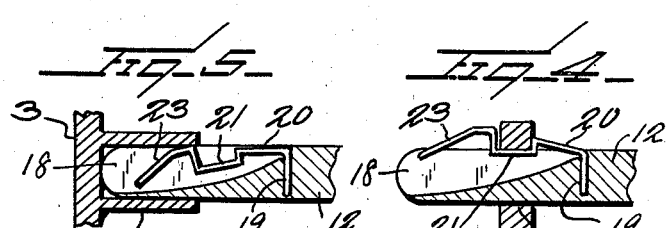
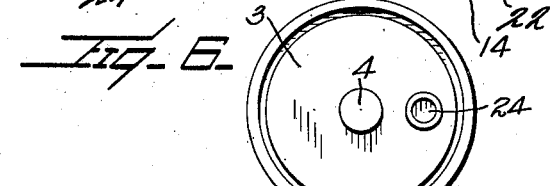
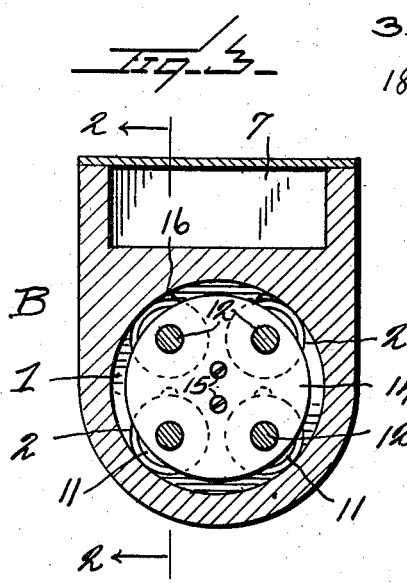
Inventor
W. A. Bertrand
By Watson E. Coleman
Attorney Patented July 19, 1938

2,124,363

UNITED STATES PATENT OFFICE 2,124,363

MASTER CYLINDER FOR HYDRAULIC BRAKING SYSTEMS

Wallace A. Bertrand, Parkersburg, W. Va.

Application February 11, 1937, Serial No. 125,312

13 Claims. (Cl. 60—54.5)

This invention relates to a master cylinder for a hydraulic braking system and more particularly to a system of this kind designed for use in connection with motor driven vehicles, and it is primarily an object of the invention to provide a master cylinder operating to give a true hydraulic pressure distribution to all brakes and wherein is provided means whereby is locked out such part of the system which may become ineffective without interfering with the operation of the remainder of the system.

Another object of the invention is to provide a master cylinder of this kind comprising means whereby a part which is locked against operation may be conveniently released when desired.

The invention consists in the details of construction and in the combination and arrangement of the several parts of my improved master cylinder for a hydraulic braking system whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is an elevational view of a diagrammatic character illustrating a master cylinder or pressure unit constructed in accordance with an embodiment of my invention;

Figure 2 is an enlarged view partly in longitudinal section and partly in elevation taken through the block as comprised in Figure 1;

Figure 3 is a transverse sectional view taken substantially on the line 3—3 of Figure 2 looking in the direction of the arrow;

Figure 4 is a fragmentary view partly in section and partly in elevation illustrating one of the pistons of a subcylinder locked against return movement;

Figure 5 is a fragmentary view partly in section and partly in elevation illustrating the main piston engaged with a stem of a piston for a subcylinder, illustrating the manner herein disclosed for releasing a locked piston; and Figure 6 is a fragmentary view in elevation of the main piston and particularly illustrating the unlocking sleeve carried by the main piston.

As disclosed in the accompanying drawing, B denotes a block of desired dimensions which is formed at one end portion with a main cylinder 1 which has in communication therewith a series of subcylinders 2 formed in the opposite end portion of the block B. As herein disclosed, these subcylinders 2 are four in number but I do not wish to be understood as limiting myself in this respect as the number of these cylinders may be varied as the requirements of practice may determine. The subcylinders 2 are also preferably equi-distantly spaced around the axial center of the main cylinder 1.

Arranged within the main cylinder 1 for rectilinear movement is the main piston 3 secured to the inserted end portion of the rod 4 which, as diametrically indicated in the accompanying drawing, is operatively connected, as at 5, as by a clevis pin or the like, with a pedal 6 or other element comprised in the operating means for the piston 3. This connection 5 may also be as preferred it only being necessary that it be of a type to allow for ready disconnection for a purpose to be hereinafter more particularly referred to.

In the present embodiment of my invention, the upper portion of the block B is formed to provide a reservoir 7 which is in communication at all times with the cylinder 1 through the ports 8. This is to take care of seepage and volume changes of the fluid and also to allow fluid into the cylinder 1 so that there will be no back pressure when the brakes are applied.

The subcylinders 2 have leading therefrom the pipe lines 9 which are intended for proper communication with the brake cylinders (not shown) so that upon proper operation of the piston 3 and with the system normal, proper pressure is transmitted through the medium of the liquid to effect the setting of the brakes.

It is highly important should for any reason, such as by rupture of a line 9, a part of the system become inoperative to lock out such part in a manner to permit the remainder of the system to operate until it is convenient to make the necessary repairs. To accomplish this purpose the subcylinders 2 have mounted therein the pistons 11 fixed to the stems 12. These stems 12 are snugly but freely directed through a guide plate 14 secured by the screws 15 or the like to the inner end of the cylinder 1 and partially overlying the inner open ends of the subcylinders 2.

The walls of the cylinders 2 at their inner open ends are formed with the ports 16 of a length to provide communication between the cylinder 1 and the cylinders 2 when the piston 3 together with the pistons 11 are in full release position. This position is preferably maintained by coil springs 17 positioned within the cylinders 2 for coaction with the pistons 11.

The combined area of the pistons 11 is less than the area of the piston 3 so that as pressure movement is imposed by the piston 3 the pistons 11 must move at the same speed until the ports 16 are closed whereupon as the pressure movement of the piston 3 continues the pistons 11 must have a greater linear movement to displace unit volume of fluid than the corresponding movement of the piston 3. It is, therefore, believed to be obvious that during this movement the pistons 11 will move inwardly of their cylinders 2 at a greater speed than the pressure movement of the piston 3 thus assuring a truly hydraulic action upon the brakes with which the pipe lines communicate.

The stems 12 are of such length that when the pistons 3 and 11 are in their normally retracted position the outer extremities of these stems will have direct contact with the piston 3 so that during the initial setting of the brakes the pistons 11 will be mechanically operated by such contact and until the ports 16 have been closed off. It is also to be stated that these stems 12 are of a length to have their outer end portions at all times within the cylinder 1 beyond the guide plate 14.

The outer end portion of each of the stems 12 is, as herein disclosed, bifurcated to provide a kerf 18 which is adapted to receive a spring catch 19. This catch 19 at one end portion is suitably secured to the base of the kerf 18 and the remaining portion of the catch normally projects laterally beyond the stem 12. The portion 20 of the catch immediately adjacent to the bottom of the kerf serves as a striker plate to effect movement of the catch 19 entirely within the kerf 18 as such stem 12 has abnormal movement inwardly of this piston 3 as will hereinafter be more specifically mentioned. As this stem 12 continues on its abnormal inward movement the locking recess 21 of the catch will come into proper register with the marginal portion of the guide plate 14 defining the opening 22 in the plate through which the stem passes. When this register occurs the inherent resiliency of the catch will cause the same to swing outwardly into locking engagement with such marginal portion of the plate 14 whereby said stem 12 is locked against retraction until the latch is adjusted into released position. The latch 19 outwardly of the recess 21 is provided with an inwardly and outwardly inclined portion providing a second striking plate 23. Should any one of the lines 9 become ruptured or the fluid therein leak out from any cause, as the piston 3 starts on its inward or compression stroke and the pistons 11 force or push inwardly beyond the port 16 or bypass as it may be called, the piston 11 within the cylinder with which the ruptured or leaking line 9 communicates will have abnormal inward travel bringing the latch 19 into locking engagement with the plate 14. Thus, this particular piston is locked against operation yet no interference or hindrance is offered to the required operation of the pistons in the other cylinders 2. In other words, the construction and assembly of the master cylinder as herein disclosed is such that a ruptured or otherwise ineffective line leading to a brake is automatically cut out and maintained ineffective until after the necessary repairs or replacements have been made. It is also believed to be apparent that the locked piston 11 will close the flow of liquid out from the cylinder 1 so that the only liquid waste will be that in advance of the locked piston 11.

When it is desired to release the locked piston to allow the same to return to its normal functioning position, the operative connection between the rod 4 and the foot pedal 6 is released as by withdrawal of a clevis pin. The piston 3 can then be readily rotated within the cylinder 1 by imposing turning movement upon the extended portion of the rod 4. The working or pressure face of the piston 3 has extending outwardly therefrom a sleeve 24 of desired length and of a diameter to snugly receive the outer or extended portion of any one of the stems 12. Therefore, after the piston 3 has been rotated within its cylinder 1 to bring this sleeve 24 into proper alignment with the locked stem, the piston 3 is then caused to move inwardly of the cylinder 1. During this movement the outer end portion of the locked stem 12 is received within the sleeve 24 and the outer end of the sleeve contacts with the striker plate 23 of the latch causing the same to move inwardly of the kerf 18 and to a position entirely released from the plate 14. As the latch 19 is released from the plate 14 the stem 12 will move outwardly into the sleeve 24. After the release of the locked piston of the line to be repaired and of course the necessary operations performed to disengage the stem 12 from within the sleeve 24, the piston 3 is rotated back to its desired position so that it can be again operatively connected with the pedal.

From the foregoing description it is thought to be obvious that a master cylinder for a hydraulic brake system constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A pressure unit for use in a hydraulic braking system comprising a main cylinder, subcylinders in communication with the main cylinder, each of said subcylinders being adapted for communication with the operating mechanism for a brake, a main piston working in the main cylinder, pistons working in the subcylinders, means for connecting the main cylinder with an operator, and stems to which are connected the pistons in the subcylinders, said stems having free contact with the main cylinder when the main cylinder and subcylinders are in full release, the aggregate working areas of the pistons in the subcylinders being less than the area of the working face of the main piston, said subcylinders having bypasses communicating therewith for a limited distance inwardly from the outer ends of said subcylinders, said bypasses being also in communication with the main cylinder, the pistons within the subcylinders passing beyond said bypasses upon initial unitary movement of the main piston and the pistons within the subcylinders.

2. A pressure unit for use in a hydraulic braking system comprising a main cylinder, subcylinders in communication with the main cylinder, each of said subcylinders being adapted for communication with the operating mechanism for a brake, a main piston working in the main cylinder, pistons working in the subcylinders, means for connecting the main cylinder with an operator, stems to which are connected the pistons in the subcylinders, said stems having free contact with the main cylinder when the main cylinder and subcylinders are in full release, the aggregate working areas of the pistons in the subcylinders being less than the area of the working face of the main piston, said subcylinders having bypasses communicating therewith for a limited distance inwardly from the outer ends of said subcylinders, said bypasses being also in communication with the main cylinder, the pistons within the subcylinders passing beyond said bypasses upon initial unitary movement of the main piston and the pistons within the subcylinders, and a guide plate partially overlying the outer end of each of the subcylinders, said overlying portion of the plate having an opening through which freely passes the stem of the piston working in said subcylinder.

3. A pressure unit for use in a hydraulic braking system comprising a main cylinder, subcylinders in communication with the main cylinder, each of said subcylinders being adapted for communication with the operating mechanism for a brake, a main piston working in the main cylinder, pistons working in the subcylinders, means for connecting the main cylinder with an operator, stems to which are connected the pistons in the subcylinders, said stems having free contact with the main cylinder when the main cylinder and subcylinders are in full release, the aggregate working areas of the pistons in the subcylinders being less than the area of the working face of the main piston, said subcylinders having bypasses communicating therewith for a limited distance inwardly from the outer ends of said subcylinders, said bypasses being also in communication with the main cylinder, the pistons within the subcylinders passing beyond said bypasses upon initial unitary movement of the main piston and the pistons within the subcylinders, and means for locking each of the pistons in the subcylinders upon abnormal movement of a piston within its subcylinder.

4. A pressure unit for use in a hydraulic braking system comprising a main cylinder, subcylinders in communication with the main cylinder, each of said subcylinders being adapted for communication with the operating mechanism for a brake, a main piston working in the main cylinder, pistons working in the subcylinders, means for connecting the main cylinder with an operator, stems to which are connected the pistons in the subcylinders, said stems having free contact with the main cylinder when the main cylinder and subcylinders are in full release, the aggregate working areas of the pistons in the subcylinders being less than the area of the working face of the main piston, said subcylinders having bypasses communicating therewith for a limited distance inwardly from the outer ends of said subcylinders, said bypasses being also in communication with the main cylinder, the pistons within the subcylinders passing beyond said bypasses upon initial unitary movement of the main piston and the pistons within the subcylinders, means for locking each of the pistons in the subcylinders upon abnormal movement of a piston within its subcylinder, and means carried by the main piston for releasing a locked piston in a subcylinder.

5. A pressure unit for use in a hydraulic braking system comprising a main cylinder, subcylinders in communication with the main cylinder, each of said subcylinders being adapted for communication with the operating mechanism for a brake, a main piston working in the main cylinder, pistons working in the subcylinders, means for connecting the main cylinder with an operator, stems to which are connected the pistons in the subcylinders, said stems having free contact with the main cylinder when the main cylinder and subcylinders are in full release, the aggregate working areas of the pistons in the subcylinders being less than the area of the working face of the main piston, said subcylinders having bypasses communicating therewith for a limited distance inwardly from the outer ends of said subcylinders, said bypasses being also in communication with the main cylinder, the pistons within the subcylinders passing beyond said bypasses upon initial unitary movement of the main piston and the pistons within the subcylinders, a guide plate partially overlying the outer end of each of the subcylinders, said overlying portion of the plate having an opening through which freely passes the stem of the piston working in said subcylinder, and a locking means carried by each of the stems to engage the guide plate upon undue inward travel of a piston within a subcylinder to lock said piston against return movement.

6. A pressure unit for use in a hydraulic braking system comprising a main cylinder, subcylinders in communication with the main cylinder, each of said subcylinders being adapted for communication with the operating mechanism for a brake, a main piston working in the main cylinder, pistons working in the subcylinders, means for connecting the main cylinder with an operator, stems to which are connected the pistons in the subcylinders, said stems having free contact with the main cylinder when the main cylinder and subcylinders are in full release, the aggregate working areas of the pistons in the subcylinders being less than the area of the working face of the main piston, said subcylinders having bypasses communicating therewith for a limited distance inwardly from the outer ends of said subcylinders, said bypasses being also in communication with the main cylinder, the pistons within the subcylinders passing beyond said bypasses upon initial unitary movement of the main piston and the pistons within the subcylinders, a guide plate partially overlying the outer end of each of the subcylinders, said overlying portion of the plate having an opening through which freely passes the stem of the piston working in said subcylinder, a locking means carried by each of the stems to engage the guide plate upon undue inward travel of a piston within a subcylinder to lock said piston against return movement, and means carried by the main piston to engage the locking means of a locked piston to release the same.

7. A pressure unit for use in a hydraulic braking system comprising a main cylinder, subcylinders in communication with the main cylinder, each of said subcylinders being adapted for communication with the operating mechanism for a brake, a main piston working in the main cylinder, pistons working in the subcylinders, means for connecting the main cylinder with an operator, the aggregate working areas of the pistons in the subcylinders being less than the area of the working face of the main piston, said subcylinders having bypasses communicating therewith for a limited distance inwardly from the outer ends of said subcylinders, said bypasses being also in communication with the main cylinders, the pistons within the subcylinders passing beyond said bypasses upon initial unitary movement of the main piston and the pistons within the subcylinders, said subpistons being free for movement independently of the main piston, each of said subpistons having a part for free contact with the main piston when the main piston and the subpiston are in full release.

8. A pressure unit for use in a hydraulic braking system comprising a main cylinder, subcylinders in communication with the main cylinder, each of said subcylinders being adapted for communication with the operating mechanism for a brake, a main piston working in the main cylinder, pistons working in the subcylinders, means for connecting the main cylinder with an operator, the aggregate working areas of the pistons in the subcylinders being less than the area of the working face of the main piston, said subcylinders having bypasses communicating therewith for a limited distance inwardly from the outer ends of said subcylinders, said bypasses being also in communication with the main cylinders, the pistons within the subcylinders passing beyond said bypasses upon initial unitary movement of the main piston and the pistons within the subcylinders, said subpistons being free for movement independently of the main piston, each of said subpistons having a part for free contact with the main piston when the main piston and the subpiston are in full release, and means for locking each of the subpistons against return upon abnormal movement of such piston inwardly of its subcylinder.

9. A pressure unit for use in a hydraulic braking system comprising a main cylinder, subcylinders in communication with the main cylinder, each of said subcylinders being adapted for communication with the operating mechanism for a brake, a main piston working in the main cylinder, pistons working in the subcylinders, means for connecting the main cylinder with an operator, the aggregate working areas of the pistons in the subcylinders being less than the area of the working face of the main piston, said subcylinders having bypasses communicating therewith for a limited distance inwardly from the outer ends of said subcylinders, said bypasses being also in communication with the main cylinders, the pistons within the subcylinders passing beyond said bypasses upon initial unitary movement of the main piston and the pistons within the subcylinders, said subpistons being free for movement independently of the main piston, means for locking each of the subpistons against return upon abnormal movement of such piston inwardly of its subcylinder, and a member carried by the main piston and extending toward the subcylinders for releasing a locked piston of a subcylinder.

10. A pressure unit for use in a hydraulic braking system comprising a main cylinder, subcylinders in communication with the main cylinder, each of said subcylinders being adapted for communication with the operating mechanism for a brake, a main piston working in the main cylinder, pistons working in the subcylinders, means for connecting the main cylinder with an operator, the aggregate working areas of the pistons in the subcylinders being less than the area of the working face of the main piston, said subcylinders having bypasses communicating therewith for a limited distance inwardly from the outer ends of said subcylinders, said bypasses being also in communication with the main cylinders, the pistons within the subcylinders passing beyond said bypasses upon initial unitary movement of the main piston and the pistons within the subcylinders, said subpistons being free for movement independently of the main piston, means for locking each of the subpistons against return upon abnormal movement of such piston inwardly of its subcylinder, and means carried by the main piston for releasing a locked piston of a subcylinder.

11. A pressure unit for use in a hydraulic braking system comprising a main cylinder, subcylinders in communication with the main cylinder, each of said subcylinders being adapted for communication with the operating mechanism for a brake, a main piston working in the main cylinder, pistons working in the subcylinders, means for connecting the main cylinder with an operator, stems to which are connected the pistons in the subcylinders, said stems having free contact with the main cylinder when the main cylinder and subcylinders are in full release, the aggregate working areas of the pistons in the subcylinders being less than the area of the working face of the main piston, said subcylinders having bypasses communicating therewith for a limited distance inwardly from the outer ends of said subcylinders, said bypasses being also in communication with the main cylinder, the pistons within the subcylinders passing beyond said bypasses upon initial unitary movement of the main piston and the pistons within the subcylinders, and a spring latch carried by the outer portion of each of the stems, the associated subcylinder having a part engaged by said latch for locking the subpiston of the stem in its subcylinder upon abnormal movement of the piston within its subcylinder.

12. A pressure unit for use in a hydraulic braking system comprising a main cylinder, subcylinders in communication with the main cylinder, each of said subcylinders being adapted for communication with the operating mechanism for a brake, a main piston working in the main cylinder, pistons working in the subcylinders, means for connecting the main cylinder with an operator, stems to which are connected the pistons in the subcylinders, said stems having free contact with the main cylinder when the main cylinder and subcylinders are in full release, the aggregate working areas of the pistons in the subcylinders being less than the area of the working face of the main piston, said subcylinders having bypasses communicating therewith for a limited distance inwardly from the outer ends of said subcylinders, said bypasses being also in communication with the main cylinder, the pistons within the subcylinders passing beyond said bypasses upon initial unitary movement of the main piston and the pistons within the subcylinders, and a spring latch carried by the outer portion of each of the stems, the associated subcylinder having a part engaged by said latch for locking the subpiston of the stem in its subcylinder upon abnormal movement of the piston within its subcylinder, the adjacent portion of the stem being cut-out to receive the latch to permit said latch to be moved into release position.

13. A pressure unit for use in a hydraulic braking system comprising a main cylinder, subcylinders in communication with the main cylinder, each of said subcylinders being adapted for communication with the operating mechanism for a brake, a main piston working in the main cylinder, pistons working in the subcylinders, means for connecting the main cylinder with an operator, stems to which are connected the pistons in the subcylinders, said stems having free contact with the main cylinder when the main cylinder and subcylinders are in full release, the aggregate working areas of the pistons in the subcylinders being less than the area of the working face of the main piston, said subcylinders having bypasses communicating therewith for a limited distance inwardly from the outer ends of said subcylinders, said bypasses being also in communication with the main cylinder, the pistons within the subcylinders passing beyond said bypasses upon initial unitary movement of the main piston and the pistons within the sub-cylinders, a spring latch carried by the outer portion of each of the stems, the associated subcylinder having a part engaged by said latch for locking the subpiston of the stem in its subcylinder upon abnormal movement of the piston within its subcylinder, and a sleeve extending outwardly from the pressure face of the main piston to telescopically receive the outer end portion of a stem upon proper manipulation of the main piston, said sleeve as the stem enters therein engaging the latch to release the same.

WALLACE A. BERTRAND.